(12) United States Patent
Darga et al.

(10) Patent No.: US 9,478,812 B1
(45) Date of Patent: Oct. 25, 2016

(54) INTERCONNECT FOR FUEL CELL STACK

(71) Applicant: Bloom Energy Corporation, Sunnyvale, CA (US)

(72) Inventors: Daniel Darga, Pleasanton, CA (US); Avinash Verma, Cupertino, CA (US); Stephen Couse, Sunnyvale, CA (US); Tad Armstrong, Burlingame, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 303 days.

(21) Appl. No.: 14/054,952

(22) Filed: Oct. 16, 2013

Related U.S. Application Data (60) Provisional application No. 61/714,928, filed on Oct. 17, 2012.

(51) Int. Cl.
*H01M 8/02* (2016.01)

(52) U.S. Cl.
CPC .................................. *H01M 8/0247* (2013.01)

(58) Field of Classification Search
CPC ........... H01M 8/1213; H01M 4/8885; H01M 4/8835; H01M 4/8857; H01M 2008/1293; H01M 8/0247; B32B 2264/102; B32B 2264/107; B32B 2307/736; B32B 2457/18; Y02E 60/521
See application file for complete search history.

(56) References Cited

U.S. PATENT DOCUMENTS

| | | | |
|---|---|---|---|
| 4,135,041 A | 1/1979 | Jung et al. | |
| 4,292,379 A | 9/1981 | Kothmann | |
| 4,755,429 A | 7/1988 | Nickols et al. | |
| 4,913,982 A | 4/1990 | Kotchick et al. | |
| 5,162,167 A | 11/1992 | Minh et al. | |
| 5,213,910 A | 5/1993 | Yamada | |
| 5,215,946 A | 6/1993 | Minh | |
| 5,248,712 A | 9/1993 | Takeuchi et al. | |
| 5,256,499 A | 10/1993 | Minh et al. | |
| 5,273,837 A | 12/1993 | Aitken et al. | |
| 5,290,642 A | 3/1994 | Minh et al. | |

(Continued)

FOREIGN PATENT DOCUMENTS

| | | |
|---|---|---|
| EP | 0615299 A1 | 9/1994 |
| JP | 61148766 | 7/1986 |

(Continued)

OTHER PUBLICATIONS

"Powder Metallurgy Design Manual," 3rd Edition, copyright Metal Powder Industries Federation, 1998.

(Continued)

*Primary Examiner* — Muhammad Siddiquee
(74) *Attorney, Agent, or Firm* — The Marbury Law Group PLLC (57) ABSTRACT

Various embodiments include interconnects for a fuel cell stack that includes a first support frame having a first surface that is configured to be secured to a first surface of a fuel cell. A gas flow separator section is secured to a second surface of the first support frame, opposite the first surface of the first support frame. A second support frame is secured to a second surface of a second fuel cell, opposite the first surface of the first fuel cell. The first and second support frames have a coefficient of thermal expansion (CTE) that substantially matches the CTE of the electrolyte material of the fuel cells, and the gas flow separator section has a CTE that does not substantially match a CTE of an electrolyte material of the fuel cells.

12 Claims, 9 Drawing Sheets

(56) References Cited

U.S. PATENT DOCUMENTS

| | | |
|---|---|---|
| 5,342,705 A | 8/1994 | Minh et al. |
| 5,368,667 A | 11/1994 | Minh et al. |
| 5,382,315 A | 1/1995 | Kumar |
| 5,453,331 A | 9/1995 | Bloom et al. |
| 5,460,897 A | 10/1995 | Gibson et al. |
| 5,494,700 A | 2/1996 | Anderson et al. |
| 5,501,914 A | 3/1996 | Satake et al. |
| 5,518,829 A | 5/1996 | Satake et al. |
| 5,554,454 A | 9/1996 | Gardner et al. |
| 5,589,017 A | 12/1996 | Minh |
| 5,641,585 A | 6/1997 | Lessing et al. |
| 5,733,499 A | 3/1998 | Takeuchi et al. |
| 5,942,349 A | 8/1999 | Badwal et al. |
| 5,955,392 A | 9/1999 | Takeuchi et al. |
| 5,964,991 A | 10/1999 | Kawasaki et al. |
| 5,981,098 A * | 11/1999 | Vitale ............... H01M 8/0228 429/492 |
| 6,001,761 A | 12/1999 | Hata et al. |
| 6,183,897 B1 | 2/2001 | Hartvigsen et al. |
| 6,251,534 B1 | 6/2001 | McElroy |
| 6,280,868 B1 | 8/2001 | Badwal et al. |
| 6,348,280 B1 | 2/2002 | Maeda et al. |
| 6,361,892 B1 | 3/2002 | Ruhl et al. |
| 6,406,809 B1 * | 6/2002 | Fujii ............... H01M 8/0263 429/434 |
| 6,444,340 B1 | 9/2002 | Jaffrey |
| 6,492,053 B1 | 12/2002 | Donelson et al. |
| 6,492,055 B1 | 12/2002 | Shimotori et al. |
| 6,503,653 B2 | 1/2003 | Rock |
| 6,582,845 B2 | 6/2003 | Helfinstine et al. |
| 6,589,681 B1 | 7/2003 | Yamanis |
| 6,635,378 B1 | 10/2003 | Yang et al. |
| 6,777,126 B1 | 8/2004 | Allen |
| 6,803,136 B2 | 10/2004 | Ong et al. |
| 6,835,488 B2 | 12/2004 | Sasahara et al. |
| 6,890,677 B2 | 5/2005 | Klitsner et al. |
| 6,945,266 B2 | 9/2005 | De Tezanos Pinto |
| 7,045,237 B2 | 5/2006 | Sridhar et al. |
| 7,150,934 B2 | 12/2006 | Yoshida et al. |
| 8,173,063 B2 | 5/2012 | Zobl et al. |
| 8,563,180 B2 | 10/2013 | Perry et al. |
| 2002/0012825 A1 | 1/2002 | Sasahara et al. |
| 2002/0081478 A1 | 6/2002 | Busenbender |
| 2002/0132156 A1 | 9/2002 | Ruhl et al. |
| 2003/0022053 A1 | 1/2003 | Anderson et al. |
| 2003/0082434 A1 | 5/2003 | Wang et al. |
| 2003/0157387 A1 | 8/2003 | Hase et al. |
| 2003/0165730 A1 | 9/2003 | Dohle et al. |
| 2003/0170527 A1 | 9/2003 | Finn et al. |
| 2003/0180602 A1 | 9/2003 | Finn |
| 2004/0101742 A1 | 5/2004 | Simpkins et al. |
| 2004/0115509 A1 * | 6/2004 | Yoshida ............... H01M 8/0263 429/434 |
| 2004/0151975 A1 | 8/2004 | Allen |
| 2004/0200187 A1 | 10/2004 | Warrier et al. |
| 2004/0265675 A1 | 12/2004 | Woodcock et al. |
| 2005/0008921 A1 | 1/2005 | Johnson |
| 2005/0017055 A1 | 1/2005 | Kurz et al. |
| 2005/0019646 A1 | 1/2005 | Joos |
| 2005/0136312 A1 | 6/2005 | Bourgeois et al. |
| 2005/0227134 A1 | 10/2005 | Nguyen |
| 2005/0255364 A1 | 11/2005 | Cho et al. |
| 2006/0154125 A1 | 7/2006 | Na et al. |
| 2006/0192323 A1 | 8/2006 | Zobl et al. |
| 2006/0204826 A1 | 9/2006 | Borchers |
| 2006/0204827 A1 | 9/2006 | Hickey et al. |
| 2006/0240309 A1 | 10/2006 | Dehne |
| 2006/0275649 A1 | 12/2006 | Keller et al. |
| 2007/0042257 A1 | 2/2007 | Chyou et al. |
| 2007/0134532 A1 | 6/2007 | Jacobson et al. |
| 2007/0196704 A1 | 8/2007 | Valensa et al. |
| 2007/0207375 A1 | 9/2007 | Jacobson et al. |
| 2007/0231676 A1 | 10/2007 | Cassidy et al. |
| 2008/0081223 A1 | 4/2008 | Yasumoto et al. |
| 2008/0193825 A1 | 8/2008 | Nguyen et al. |
| 2008/0199738 A1 | 8/2008 | Perry et al. |
| 2009/0068535 A1 | 3/2009 | Owejan et al. |
| 2010/0119909 A1 | 5/2010 | McElroy et al. |
| 2010/0119917 A1 | 5/2010 | Kumar et al. |
| 2010/0239937 A1 | 9/2010 | Janousek et al. |
| 2011/0143261 A1 | 6/2011 | Brandner et al. |
| 2011/0223510 A1 | 9/2011 | Greiner et al. |
| 2011/0275006 A1 * | 11/2011 | Hawkes ............... H01M 8/0228 429/482 |
| 2013/0129557 A1 * | 5/2013 | Herchen ............... H01M 8/0202 419/62 |
| 2013/0130146 A1 | 5/2013 | Batawi et al. |
| 2013/0130152 A1 | 5/2013 | Couse et al. |
| 2013/0130154 A1 | 5/2013 | Darga et al. |
| 2014/0272665 A1 * | 9/2014 | Yoon ............... B32B 5/16 429/482 |

FOREIGN PATENT DOCUMENTS

| | | |
|---|---|---|
| JP | 6-215778 | 8/1994 |
| JP | 09-199143 | 7/1997 |
| JP | 09-223506 | 8/1997 |
| JP | 09-245810 | 9/1997 |
| JP | 09-245811 | 9/1997 |
| JP | 09-277226 | 10/1997 |
| JP | 2000-281438 | 10/2000 |
| KR | 10-2006-0019998 A | 3/2006 |
| WO | WO03/007413 A1 | 1/2003 |
| WO | WO03/071618 A2 | 8/2003 |
| WO | WO2004/102706 A2 | 11/2004 |
| WO | WO2006/016628 A1 | 2/2006 |

OTHER PUBLICATIONS

Haynes International High-Temperature Alloys, "HAYNES (Reg.) 214 (TM) alloy," 1996, pp. 1-19.

Haynes International High-Temperature Alloys, "HAYNES (Reg.) 230 (TM) alloy," 2004, pp. 1-27.

International Search Report and Written Opinion, International Application No. PCT/US2007/008224, dated Nov. 26, 2008, 10pgs.

International Search Report, International Application No. PCT/US2003/004808, dated Aug. 19, 2003, 9pgs.

Supplementary European Search Report, International Application No. PCT/US2003/004808, Jun. 2, 2008, 3pgs.

International Search Report and Written Opinion, International Application No. PCT/US2010/027899, Oct. 20, 2010, 11pgs.

International Search Report and Written Opinion, International Application No. PCT/US2012/065508, Apr. 14, 2011.

International Preliminary Report on Patentability, International Application No. PCT/US2010/027899, Sep. 20, 2011, 6pgs.

* cited by examiner

INTERCONNECT FOR FUEL CELL STACK

RELATED APPLICATIONS

This application claims the benefit of priority of U.S. Provisional Patent Application No. 61/714,928 filed Oct. 17, 2012, entitled "Interconnect for Fuel Cell Stack", the entire contents of which are incorporated by reference herein.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

In order to optimize the operation of SOFCs, the oxidizing and fuel flows should be precisely regulated. Therefore, the flow regulating structures, such as interconnects in the fuel cell system should be precisely manufactured. One type of interconnect currently used is a metal interconnect formed by a powder metallurgy technique. The metal interconnect is typically a chromium-based alloy.

SUMMARY

Embodiments include an interconnect for a fuel cell stack that includes a first support frame having a first surface that is configured to be secured to a first surface of a first fuel cell in the stack, the first support frame having a coefficient of thermal expansion (CTE) that substantially matches a CTE of an electrolyte material of the first fuel cell, and a gas flow separator section that is secured to a second surface of the first support frame, opposite the first surface of the first support frame, where the gas flow separator section has a CTE that does not substantially match the CTE of an electrolyte material of the first fuel cell. In various embodiments, the interconnect further includes a second support frame having a first surface that is configured to be secured to a second surface of a second fuel cell, opposite the first surface of the first fuel cell, the second support frame having a coefficient of thermal expansion (CTE) that substantially matches a CTE of an electrolyte material of the second fuel cell. The second support frame may have a second surface, opposite the first surface, that is configured to contact a surface of the gas flow separator section.

Further embodiments include a fuel cell stack that includes a plurality of fuel cells each having an anode-side and a cathode-side and an electrolyte material having a first coefficient of thermal expansion (CTE), and a plurality of interconnects, wherein each interconnect comprises an anode support frame attached directly or indirectly to the anode-side of a first one of a plurality of fuel cells, a cathode support frame attached to the cathode-side of a second one of the plurality of fuel cells, where the anode support frame and the cathode support frame are formed of a material having a CTE that substantially matches the CTE of the electrolyte material of the first and second fuel cells, and a gas flow separator section provided between the anode support frame and the cathode support frame, the gas flow separator section being formed of a material having a CTE that does not substantially match the CTE of the electrolyte material of the fuel cells.

Further embodiments include a fuel cell system that includes a plurality of fuel cell stacks arranged in a substantially cylindrical configuration, wherein each fuel cell stack comprises a plurality of fuel cells, and a plurality of interconnects between the fuel cells, wherein the stacks have an asymmetric cross-sectional shape perpendicular to an axis of the stack having a width dimension that increases from an initial width at or proximate to a first inner edge to a second maximum width at a position that is closer to a second outer edge than to the first inner edge.

Further embodiments include a method of fabricating a fuel cell stack that includes attaching an anode support frame to an anode-side of a fuel cell, attaching a cathode support frame to a cathode-side of the fuel cell, the anode support frame and the cathode support frame being formed of a material having a CTE that substantially matches a CTE of an electrolyte material of the fuel cell, and attaching a first gas flow separator section to one of the anode support frame and the cathode support frame, wherein the gas flow separator section is formed of a material having a CTE that does not substantially match the CTE of the electrolyte material of the fuel cell.

Further embodiments include a method of using a fuel cell stack that includes flowing a fuel in a fuel inlet flow channel defined by inlet openings formed in a plurality of stacked metal sheets, flowing the fuel into an inlet fuel plenum formed between surfaces of adjacent metal sheets, and flowing the fuel from the inlet fuel plenum through an anode support frame to a fuel flow field, the anode support frame having a first surface that is secured to an anode-side of a fuel cell and a second surface that is secured to an anode-facing surface of a metal sheet, the anode-facing surface of the metal sheet including a ridged portion that contacts the anode-side of the fuel cell to define the fuel flow field.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments include interconnects for a fuel cell stack, fuel cell stacks and systems incorporating such interconnects, and methods of fabricating interconnects for a fuel cell stack.

For solid oxide fuel cell stacks, the currently-used interconnects are typically made from an electrically conductive metal material, and may comprise a chromium alloy, such as a Cr—Fe alloy. The interconnects are typically fabricated using a powder metallurgy technique that includes pressing and sintering a Cr—Fe powder, which may be a mixture of Cr and Fe powders and/or pre-alloyed Cr—Fe powder, to form a Cr—Fe alloy interconnect in a desired size and shape (e.g., a "net shape" or "near net shape" process). A typical chromium-alloy interconnect comprises more than about 90% chromium, such as about 95% chromium. The interconnect may also contain less than about 10% iron, such as about 4-5% iron, may contain less than about 2%, such as about zero to 1%, of other materials, such as yttrium or yttria, as well as residual or unavoidable impurities.

The currently-used interconnects are typically formed as a unitary structure. When incorporated into a fuel cell stack, the interconnect is positioned between two adjacent fuel cells in the stack. The anode-side of the interconnect is secured to the anode-side of a first adjacent fuel cell via a seal. The cathode-side of the interconnect is secured to the cathode-side of the second adjacent fuel cell via another seal. The fuel cell stack may be internally manifolded for fuel and externally manifolded for air. In some cases, the stack may be internally manifolded for both fuel and air. When the stack is internally manifolded for fuel and/or air, riser channel openings are formed through the fuel cells and/or the interconnects in the stack to allow the fuel and/or air to travel through the stack to each of the fuel cells.

A primary reason why chromium-based materials are used for interconnects in fuel cell stacks is that chromium-based materials exhibit a good coefficient of thermal expansion (CTE) match with the materials, such as yttria stabilized zirconia (YSZ) and/or scandia stabilized zirconia (SSZ), commonly utilized as the electrolyte of the fuel cells. However, chromium is a relatively brittle material and processing of this material using net-shape or near-net-shape powder metallurgy techniques is very challenging and expensive. Some processes require the use of 1600+ ton presses to form the pressed powder interconnects, as well as sintering of the interconnects in a high-temperature furnace (e.g., 1350 to 1450° C.) in a hydrogen environment to produce the finished parts. In addition, chromium is a relatively expensive material, and the commercially available chromium powders are difficult to press using current powder-metallurgy techniques.

In one embodiment of the invention, the interconnect is made from multiple separate parts that may be made by methods which are less expensive and/or complex than powder metallurgy, such as metal sheet stamping, machining, etc.

Figure 1:
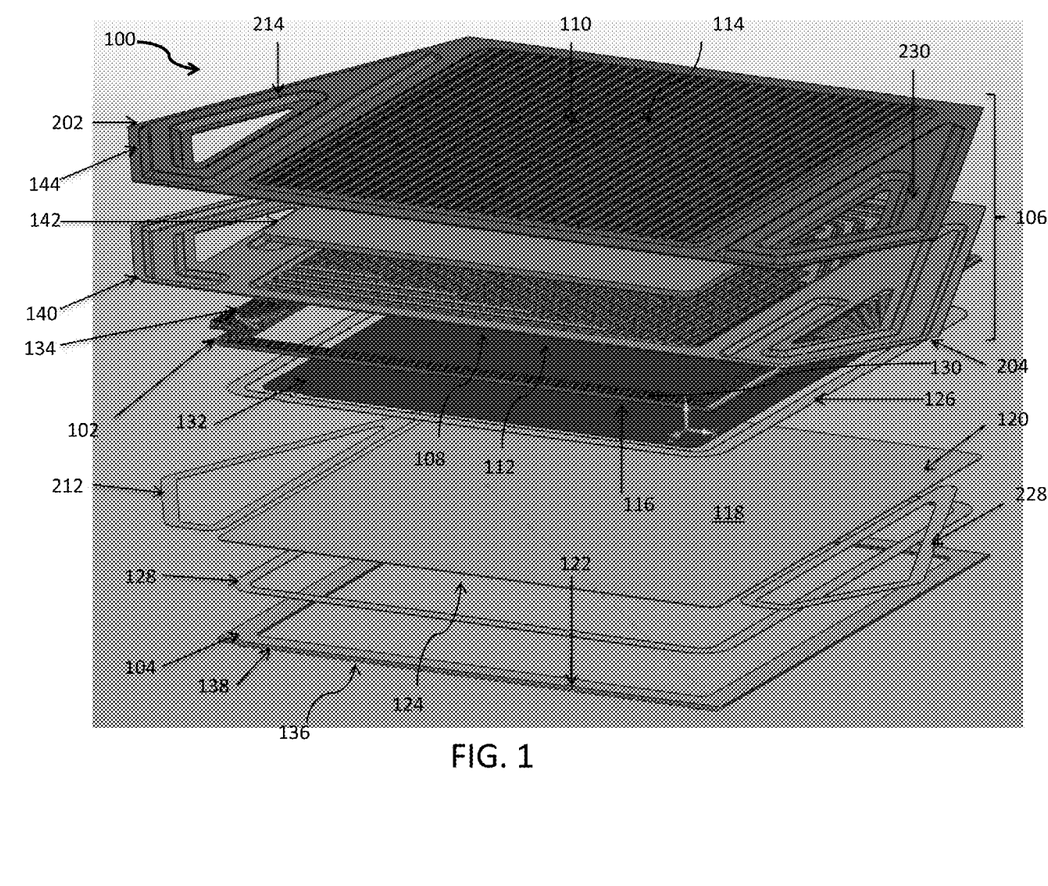
FIG. 1 is an exploded view of for a portion of a fuel cell stack containing an interconnect according to one embodiment.

Referring to FIG. 1, an interconnect 100 for a fuel cell stack according to one embodiment is shown in an exploded view. The interconnect 100 includes an anode support frame 102, a cathode support frame 104, and a gas flow separator section 106 having ridged portions 108, 110 over both an anode-facing major surface 112 and a cathode-facing major surface 114. In various embodiments, rather than an interconnect formed of a unitary structure, the present interconnect 100 may include multiple components, including at least an anode support frame 102 and a cathode support frame 104, which may be sealed to the anode- and cathode-sides of a fuel cell 120, respectively. A gas flow separator section 106 may be sealed to the anode support frame 102 and may be positioned between the anode support frame 106 and the cathode support frame 104 of an adjacent fuel cell when the interconnect 100 is incorporated in a fuel cell stack. In various embodiments as described in further detail below, the gas flow separator section 106 may include multiple components, including an anode-side stamped metal sheet 140, a cathode-side stamped metal sheet 144, and an isothermal plate 142 between the two stamped sheets 140, 144.

As shown in FIG. 1, the anode support frame 102 has a first surface 116 that is adapted to be secured to an anode-side 118 of the fuel cell 120. The cathode support frame 104 has a first surface 122 that is adapted to be secured to a cathode-side 124 of the fuel cell 120. Respective anode and cathode electrodes (not shown for clarity) are located on respective anode and cathode sides of the fuel cell 120. A first window seal 126 may be provided between the first surface 116 of the anode support frame 102 and the anode-side 118 of the fuel cell 120. A second window seal 128 may be provided between the first surface 122 of the cathode support frame 104 and the cathode-side 124 of the fuel cell 120. Any suitable seal materials, such as glass or glass-ceramic materials, may be used for seals 126, 128.

The anode support frame 102 and the cathode support frame 104 may be formed of a material having a coefficient of thermal expansion (CTE) that substantially matches a CTE of the fuel cell 120, and in particular a CTE of an electrolyte material of the electrolyte-supported fuel cell 120. In various embodiments, the anode support frame 102 and/or the cathode support frame 104 may have a CTE that is within about 1%, such as within 0.5%, and preferably within 0-0.1% of the CTE of an electrolyte material for the fuel cell. The fuel cell 120 may be a solid oxide fuel cell having a ceramic electrolyte material, which may be a stabilized zirconia, such as scandia stabilized ziconia (SSZ) and/or yttria stabilized zirconia (YSZ). Alternatively, the electrolyte may comprise another ionically conductive material, such as a doped ceria. In some embodiments, the CTE of the anode support frame 102 and/or the cathode support frame 104 may be between about $9.53 \times 10^{-6}/°$ C. and $9.71 \times 10^{-6}/°$ C., such as $9.57$-$9.67 \times 10^{-6}/°$ C., and preferably about $9.62 \times 10^{-6}/°$ C., to match the $9.62 \times 10^{-6}/°$ C. CTE of SSZ. Alternatively, the CTE of the support frame(s) 102, 104 can be between about 10.4-10.6×10$^{-6}$/° C., such as about 10.5× 10$^{-6}$/° C., to match the 10.5×10$^{-6}$/° C. CTE of YSZ. For anode supported cells, the CTE of the frames may be selected to match the anode CTE.

In embodiments, one or both of the anode support frame 102 and the cathode support frame 104 may formed of a chromium-based alloy, such as a chromium-iron alloy that may contain at least about 80% chromium, such as more than about 90% chromium (e.g., about 93-97% chromium), and less than about 20% iron, such as less than about 10% iron (e.g., 4-6% iron). The material of the support frame 102, 104 may further include 0% to about 2% of one or more other materials, such as yttrium or ytrria, as well as unavoidable impurities. Any other suitable materials may be used which have a CTE match to the cell electrolyte. The anode support frame 102 and the cathode support frame 104 may be formed by a suitable fabrication process, such as stamping, machining, or via a powder metallurgy technique. In embodiments, the anode support frame 102 and/or the cathode support frame 104 can have a thickness of between about 0.1 to about 10 mm, such as 0.5 to 5 mm (e.g., 0.5 to 2 mm, such as about 1 mm).

The anode support frame 102 has a second surface 130 adapted to be secured to the anode-facing major surface 112 of the gas flow separator section 106. A sealant material (not illustrated) may be provided between the second surface 130 of the anode support frame 102 and the anode-facing major surface 112 of the gas flow separator section 106. In various embodiments and as described in further detail below, the CTE of the cell electrolyte and anode support frame 102 may not match the CTE of the gas flow separator section 106 (e.g., the CTE may differ by 10% or more, such as 15-20%). When the anode support frame 102 is secured between the anode-side 118 of the fuel cell 120 and the anode-facing surface 112 of the gas flow separator section 106, the ridged portion 108 of the anode-facing major surface 112 of the gas flow separator section 106 contacts directly or indirectly against the anode-side 118 of the fuel cell 120 to define a fuel gas flow field. As shown in FIG. 1, for example, the anode support frame 102 includes at least one open interior region through which the ridged portion 108 of the anode-facing major surface 112 of the gas flow separator section 106 may extend to contact the anode-side 118 of the fuel cell 120. An anode contact conductive material 132, such as a compliant layer, may be provided between the anode-side 118 of the fuel cell 110 and the anode-facing surface 112 of the gas flow separator section 106 such that an indirect contact between the ridged portion 108 and the anode-side 118 of the fuel cell occurs. Alternatively, the conductive material 132 may be omitted, and the ridged portion 108 may directly contact the anode-side 118 of the fuel cell. The second surface 130 of the anode support frame 102 may have a plurality of ridges 134, the purpose(s) of which are described below.

The cathode support frame 104 has a second surface 136 adapted to contact a cathode-facing major surface 114 of a gas flow separator section 106. The second surface 136 of the cathode support frame 102 may contact a cathode-facing major surface 114 of a gas flow separator section 106 that is different than the gas flow separator section 106 to which the anode support frame 102 is secured. As shown in FIG. 1, for example, the cathode support frame 104 includes an open interior region through which the ridged portion 110 of the cathode-facing major surface 114 of a second gas flow separator section 106 (not shown) may extend to contact the cathode-side 124 of the fuel cell 120 and thereby define an air (e.g., oxidizer) flow field. In this way, a plurality of interconnects 100 and fuel cells 120 may be connected in series to form a fuel cell stack. The second surface 136 of the cathode support frame 104 may have a plurality of ridges 138, the purpose(s) of which are described below.

As described above, the gas flow separator section 106 may be comprised of multiple components. A first component, which in preferred embodiments comprises a shaped metal sheet 140, includes the ridged portion 108 on an anode-facing major surface 112. A second component, which in preferred embodiments also comprises a shaped metal sheet 144, includes the ridged portion 110 on a cathode-facing major surface 114. The ridged portions 108, 110 may comprise a plurality of ribs separating fuel or oxidizer flow channels in the respective flow field. The shaped metal sheets 140, 144 may be relatively thin sheets, and each sheet may have a thickness of less than about 10 mm, such as less than about 5 mm, and may preferably have a thickness that is less than about 2 mm, such as about 1 mm or less. The sheets may be formed into a desired shape using a sheet metal stamping technique. The sheets 140, 144 may be made of any metal or alloy which can withstand the 750-950° C. stack operating temperatures, such as Inconel® or Haynes® alloy (e.g., Inconel 600, Haynes 230, etc.). Embodiments may include a high temperature nickel-chromium based alloy (e.g., 40-75% Ni-14-25% Cr), optionally further including one or more of iron (e.g., <10% Fe), cobalt (e.g., <15% Co), molybdenum (e.g., <10% Mo), niobium (e.g., <6% Nb), aluminum (e.g., <2% Al), titanium (e.g., <3% Ti), as well as 1% or less each of other constituents, including manganese, copper, silicon, carbon, phosphorous and boron. Other embodiments may include a high-temperature nickel-chromium-tungsten-molybdenum based alloy (e.g., >50% Ni, 20-24% Cr, 13-15% W, 1-3% Mo), with 5% or less each of other constituents, including cobalt, iron, aluminum, manganese, carbon, silicon, phosphorous, sulfur, titanium, boron, copper and/or lanthanum, as well as other suitable high-temperature nickel-based and/or cobalt-based alloys.

An advantage of using thin sheets is that it is easier to form fine features such as the ribs using, for example, a metal stamping technique. One drawback to thin sheets is that they are relatively inefficient at conducting heat from the central region of the stack to the periphery of the stack, and ultimately out of the stack. In embodiments, the gas flow separator section 106 may include an isothermal plate 142, which may increase the ability of the gas flow separator section 106 to efficiently conduct heat from the interior of the stack to the periphery of the stack and ultimately out of the stack. The isothermal plate 142 may be positioned between and in thermal contact with the shaped metal sheets 140, 144. The isothermal plate 142 may be formed from same or different metal alloy material as the shaped metal sheets 140, 144, and may have a thickness of less than about 10 mm, such as less than about 5 mm, and may preferably have a thickness that is less than about 2 mm, such as about 1 mm or less. In embodiments, the isothermal plate 142 may be thicker than the shaped metal sheets 140, 144.

The gas flow separator section 106 may be assembled by attaching the anode-side shaped metal sheet 140 to the cathode-side shaped metal sheet 144 with the isothermal plate 142 between the two sheets 140, 144. The various components of the gas flow separator section 106 may be attached using any suitable attachment technique, such as laser welding, friction welding, brazing, spot welding, etc.

In other embodiments, the gas flow separator section 106 may comprise more or less than three components. For example, the gas flow separator section 106 may be a unitary structure having ridged portions 108, 110 defining flow fields over the anode-facing and cathode-facing surfaces of the structure. In other embodiments, the gas flow separator section 106 may be a two-piece structure that may include, for example, a first section having a ridged portion over an anode-facing surface that may be joined to a second section having a ridged portion over a cathode-facing surface. In other embodiments, the gas flow separator section 106 may include more than three components, and may include, for example, multiple isothermal plates and/or shaped metal sheets formed in multiple sections.

The component(s) of the gas flow separator section 106, such as the anode-side shaped metal sheet 140, the cathode-side shaped metal sheet 144 and the isothermal plate 142 shown in FIG. 1, may be formed of a material having a coefficient of thermal expansion (CTE) that does not substantially match a CTE of the fuel cell 120, and in particular a CTE of an electrolyte material of the fuel cell 120. In various embodiments, the one or more components of the gas flow separator section 106 may have a CTE that differs from the CTE of an electrolyte material for the fuel cell by greater than 10%, such as greater than 25%, such as 25-200%. The fuel cell 120 may be a solid oxide fuel cell having a ceramic electrolyte material, which may be a stabilized zirconia, such as scandia stabilized ziconia (SSZ) or yttria stabilized zirconia (YSZ). Alternatively, the electrolyte may comprise another ionically conductive material, such as a doped ceria. In some embodiments, the CTE of the one or more components of the gas flow separator section 106 may be less than $9.62 \times 10^{-6}/°$ C., such as less than about $9.5 \times 10^{-6}/°$ C., such as less than about $9.0 \times 10^{-6} 1°$ C., or may be greater than $9.62 \times 10^{-6} 1°$ C., such as greater than about $10.0 \times 10^{16}/°$ C., and may not match the $9.62 \times 10^{-6}/°$ C. CTE of SSZ. Alternatively, the CTE of the components of the gas flow separator section 106 may be less than $10.5 \times 10^{-6}/°$ C., such as less than about $10.0 \times 10^{-6}/°$ C., or greater than $10.5 \times 10^{-6}/°$ C., such as greater than about $11.0 \times 10^{-6}/°$ C., and may not match the $10.5 \times 10^{-6}/°$ C. CTE of YSZ.

Thus, in embodiments, the anode support frame 102 and cathode support frame 104 may have a CTE that substantially matches the CTE of the fuel cell electrolyte material (e.g., differs by 1.0% or less, such as 0.5% or less, e.g., 0-0.1%), and the gas flow separator section 106 (e.g., shaped sheet 140, shaped sheet 144 and/or isothermal plate 142) may have a CTE that does not substantially match the CTE of the fuel cell electrolyte material (e.g., differs by more than 1.0%). There may therefore be a mismatch in the CTE between the anode and cathode support frames 102, 104 and the one or more components of the gas flow separator section 106. Because these components may be made from relatively strong and sturdy materials, such as metals, these components may handle the stresses produced by the CTE mismatch better than other, more fragile components, such as the fuel cell electrolyte. In contrast, since the CTE of the frames substantially matches that of the cell electrolyte, there are little to no CTE mismatch stresses on the fragile ceramic electrolyte.

Figure 2A:
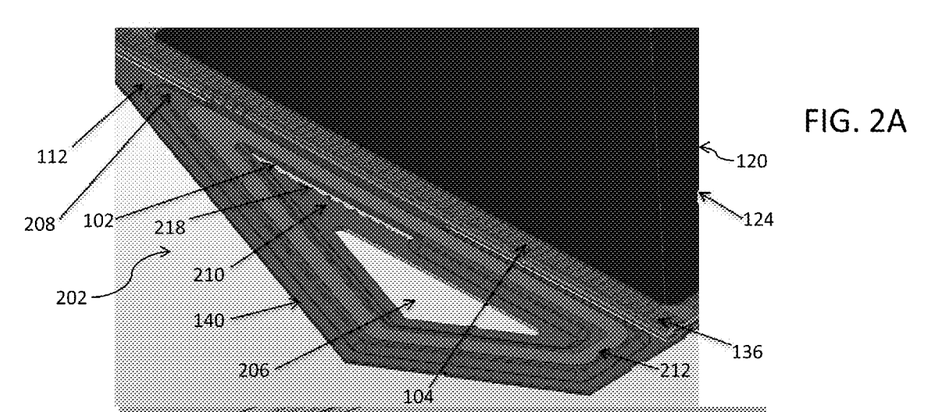
FIG. 2A illustrates a fuel inlet portion of an assembled interconnect according to one embodiment.
Figure 2B:
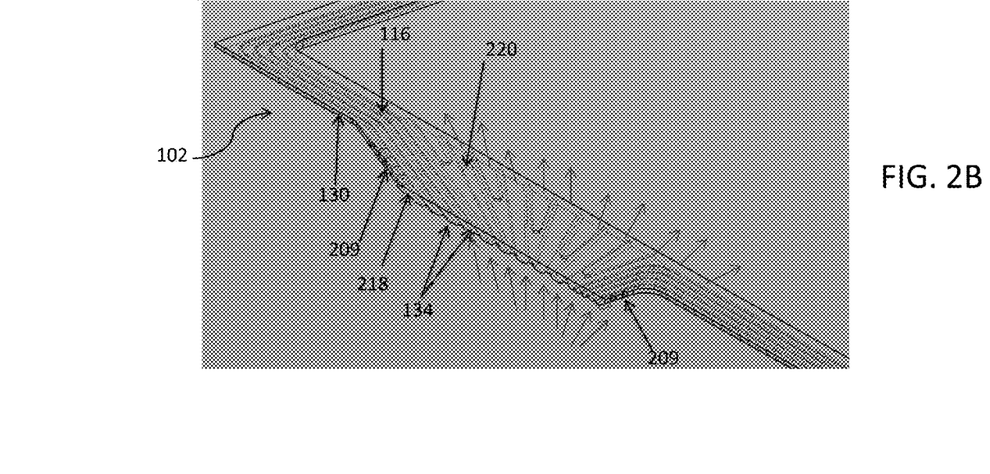
FIG. 2B illustrates the fuel inlet flow through an anode support frame of the interconnect of FIG. 2A.
Figure 5A:
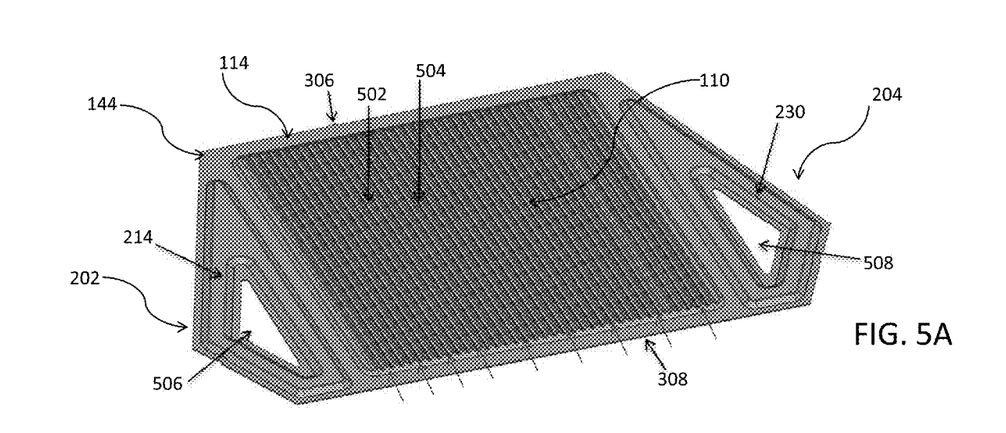
FIG. 5A illustrates the cathode-side flow field of an interconnect according to one embodiment.

As shown in FIG. 1, the interconnect 100 may include a fuel inlet portion 202 on one side of the interconnect 100, and a fuel outlet portion 204 on an opposite side of the interconnect 100. FIG. 2A illustrates the fuel inlet portion 202 of an assembled interconnect 100 according to one embodiment and FIG. 2B illustrates the fuel inlet flow path through the anode support frame 102. FIG. 2A shows the anode-facing major surface 112 of the shaped metal sheet 140. The anode-facing major surface 112 of shaped metal sheet 140 is attached to an anode support frame 102, which is in turn attached to the anode-side of a fuel cell 120. As shown in FIGS. 1 and 2A, the cathode support frame 104 is attached to the cathode-side 124 of the fuel cell 120, opposite the anode support frame 102. An inlet header opening 206 is formed in the shaped metal sheet 140. A raised portion 208 is provided in the shaped metal sheet 140 that substantially completely surrounds the inlet opening 206 with the exception of a gap 210 in the raised portion. The inlet header opening 206, raised portion 208 and gap 210 may be more clearly seen in FIG. 3. As shown in FIG. 2B, the anode support frame 102 includes a bridge 218 that extends from the periphery of the anode support frame 102. The bridge 218 is sized and shaped to fit within the gap 210 in the raised portion 208 of the shaped metal sheet 140. The bridge 218 may substantially completely fill the gap 210 in the raised portion 208, and in embodiments, may be sealed against the side walls of the raised portion 208. The ridged features 209 on the sides of the bridge 218 facilitate this sealing by providing gaps in which the seal will reside, much like the gap provided for an O-ring seal. A plenum seal 212 may be provided over the top surface of the raised portion 208 and over the bridge 218 of the anode support frame 102. The plenum seal 212 provides a fluid-tight seal between the raised portion 208 and bridge 218 and a corresponding raised portion 214 formed in the cathode-facing major surface 114 (e.g., in a cathode-side shaped metal sheet 144) of an adjacent interconnect 100. An exemplary embodiment of a raised portion 214 on a cathode-side shaped metal sheet 144 is shown in FIG. 5A. The raised portion 214 on the cathode-side sheet 144 may be similar to the raised portion 208 on the anode-side sheet 140, but may not include a gap. When the raised portions 208, 214 of the two adjacent interconnects are brought together, they define an inlet fuel plenum 210 for the fuel cell 120.

Figure 3:
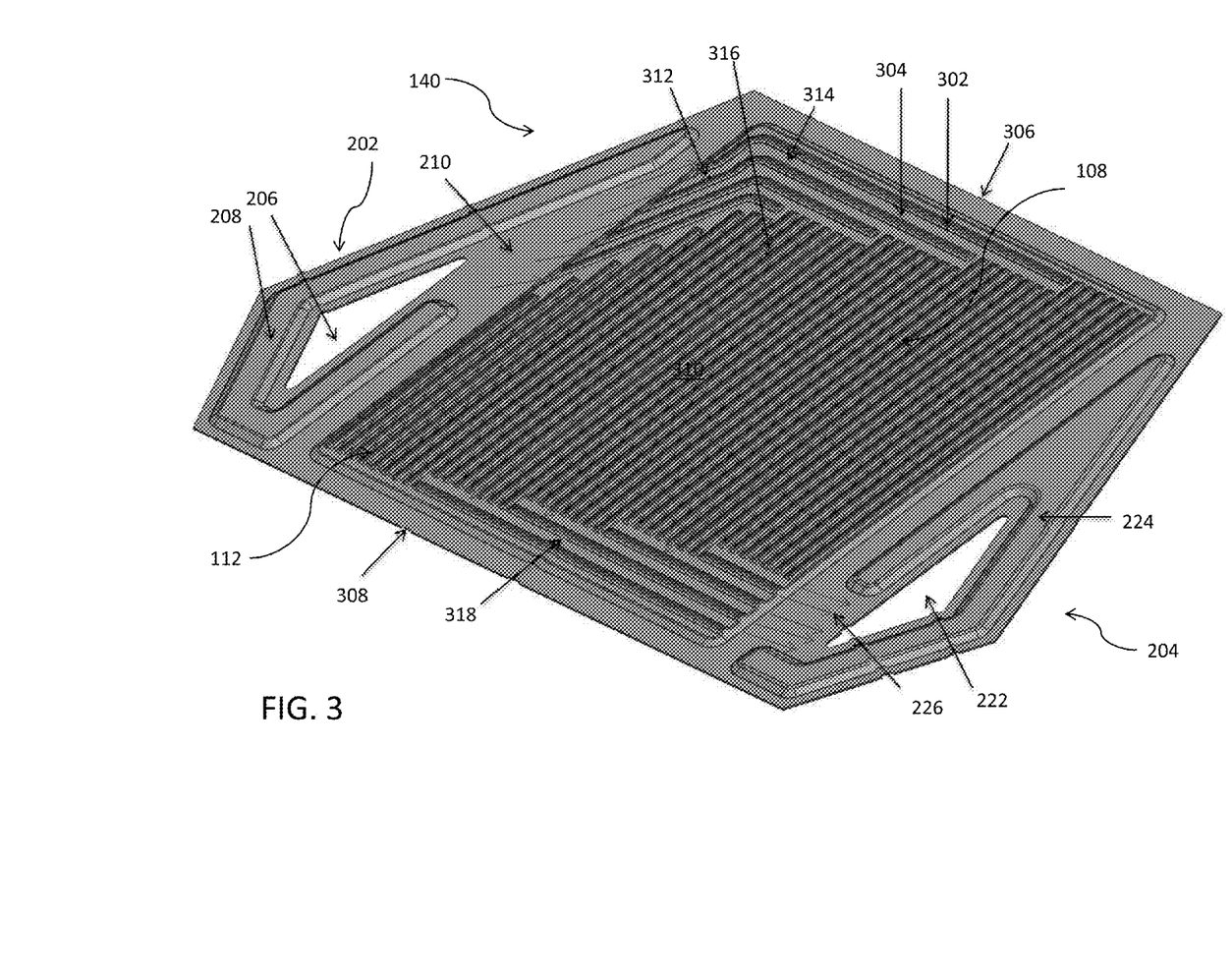
FIG. 3 illustrates the anode-side flow field of an interconnect according to one embodiment.

As is shown in FIGS. 3 and 5A, the cathode-side shaped metal sheet 144 includes a fuel opening 506 that is aligned with the fuel opening 206 in the anode-side shaped metal sheet 142. Fuel may thus travel up (or down) the fuel cell stack via a single header fuel inlet (i.e., riser opening) made from the corresponding openings 206, 506 in the respective anode-side and cathode-side shaped metal sheets 140, 144, and into the inlet plenums 216 of each fuel cell 120 for internally manifolded fuel cell stacks The fuel may enter the fuel cell via the bridge 218 of the anode support frame 102. As shown in FIG. 2B, the plurality of ridges or ribs 134 on the second surface 130 of the anode support frame 102 may define a plurality of fluid channels 220 between the ridges 134. The fuel may enter the fuel cell 120 via the channels 220 (as indicated by the arrows).

FIG. 3 illustrates the anode-facing major surface 112 of the gas flow separator section 106. In embodiments, the surface 112 may be the surface of a shaped metal sheet 140. As previously discussed, the anode-facing major surface 112 of the gas flow separator section 106 includes a ridged portion 108. The ridged portion 108 may contact against the anode side 118 of the fuel cell 120 (not shown) to form a fuel flow field. As shown in FIG. 3, the ridged portion 108 includes a plurality of ridges or ribs 302 defining fuel flow channels 304 between adjacent ridges 302. The fuel may flow from the inlet plenum 216 through the channels 304 in the ridged portion 108, where the fuel may contact the anode electrode on the anode-side of the fuel cell (not shown) and then into an outlet plenum 226 and through an outlet opening 222, as described further below.

In embodiments, the ridged portion 108 may be formed via a stamping process on a thin metal sheet. In one embodiment, the channels 304 formed between adjacent ridges 302 can have a depth that is less than about 10 mm, such as less than about 5 mm (e.g., 0.5 to 2.5 mm), and in preferred embodiments may have a depth of less than about 1 mm. The channels 304 may be wider proximate the fuel inlet plenum 216 to help distribute the fuel evenly across the flow field. The channels 304 may be narrower over the central portion of the flow field, and may then widen again proximate an outlet plenum 232.

As shown in FIG. 3, for example, the channels 304 define a fuel flow path that proceeds from the inlet opening 206 and plenum 210 parallel to a periphery on a first side 306 of the gas flow separator 106 (which may be a shorter side 306 of the gas flow separator 106), through a central region 310 of the gas flow separator 106, then parallel to the periphery on a second side 308 of the gas flow separator 106 (which may be a longer side 308 of the gas flow separator), and then to the outlet plenum 226 and opening 222. The fuel may flow in relatively wider channels 304 from the inlet plenum parallel to the periphery on the first side 306, and from the periphery on the second side 308 to the outlet plenum, and the fuel may flow in relatively narrower channels 304 between the periphery on the first side 306 through the central region 310 to the periphery on the second side 308, As shown in FIG. 3, in embodiments, the inlet opening 206 may be closer to the second (longer) side 308 of the gas flow separator 308 than the first (shorter) side 306. Thus, the fuel may be directed to flow initially towards the first (shorter) side 306 (i.e., at least partially counterflow to the main direction of fuel flow through the central region 310), such as in diagonal or oblique channels 312, towards the first side 306. At least a portion of the fuel may also be directed to flow in transverse channels 314 extending along the periphery on the first (shorter) side 306 to distribute the fuel along the length of the first side 306. The fuel may then flow in narrower channels 316 through the central region 310 to the periphery on the second (longer) side 308. Transverse channels 318 exending along the periphery of the second side 308 may direct the fuel to the outlet plenum 232.

Figure 4A:
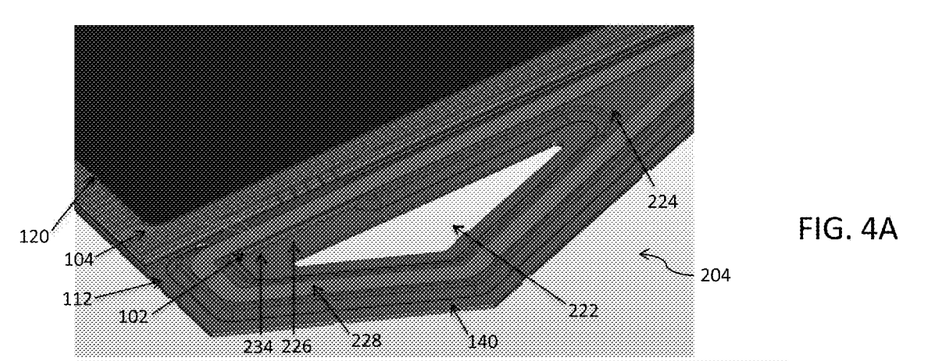
FIG. 4A illustrates a fuel outlet portion of an assembled interconnect according to one embodiment.
Figure 4B:
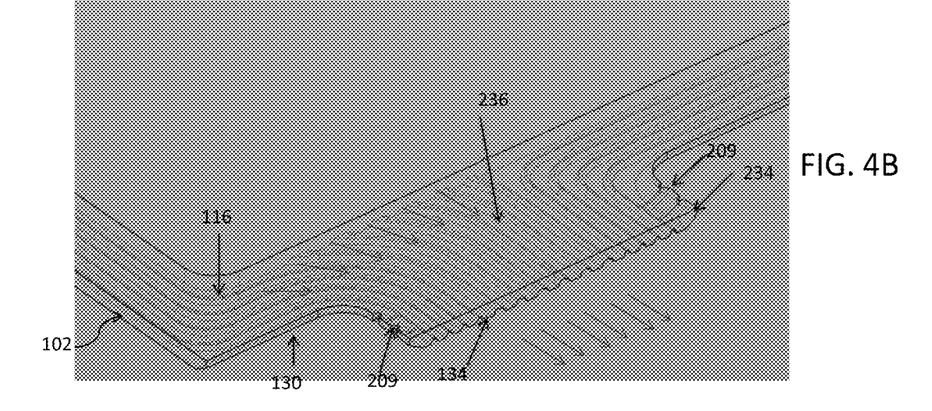
FIG. 4B illustrates the fuel outlet flow through an anode support frame of the interconnect of FIG. 4A.

FIG. 4A illustrates the fuel outlet portion 204 of an assembled interconnect 100 according to one embodiment and FIG. 4B illustrates the fuel outlet flow path through the anode support frame 102. The fuel outlet portion 204 in this embodiment is similar to the fuel inlet portion 202 described above in connection with FIGS. 2A and 2B. An outlet opening 222 is formed in the shaped metal sheet 140. A raised portion 224 is provided in the shaped metal sheet 140 that substantially surrounds the outlet opening 222 with the exception of a gap 226 in the raised portion. The outlet opening 222, raised portion 224 and gap 226 are also shown in FIG. 3. As shown in FIG. 4B, the anode support frame 102 includes a bridge 234. The bridge 234 is sized and shaped to fit within the gap 226 in the raised portion 224 of the shaped metal sheet 140. The bridge 234 may substantially completely fill the gap 226 in the raised portion 224, and in embodiments, may be sealed against the side walls of the raised portion 224. Ridged features 209 on the sides of the bridge 234 facilitate this sealing by providing gaps in which the seal will reside, much like the gap provided for an O-ring seal. An outlet plenum seal 228 may be provided over the top surface of the raised portion 224 and over the bridge 234 of the anode support frame 102. The outlet plenum seal 228 may provide a fluid-tight seal between the raised portion 224 and bridge 234 and a corresponding raised portion 230 formed in the cathode-facing major surface 114 (e.g., in a cathode-side shaped metal sheet 144) of an adjacent interconnect 100. An exemplary embodiment of a raised portion 230 on a cathode-side shaped metal sheet 144 is shown in FIG. 5A. The raised portion 230 on the cathode-side sheet 144 may be similar to the raised portion 224 on the anode-side sheet 140, but may not include a gap. When the raised portions 224, 230 of the two adjacent interconnects are brought together, they define an outlet fuel plenum 226 or fuel outlet riser opening for the fuel cell 120.

As is shown in FIGS. 4A and 5A, the cathode-side shaped metal sheet 144 includes a fuel outlet opening 508 that is aligned with the fuel outlet opening 222 in the anode-side shaped metal sheet 142. The outlet fuel stream may thus exit the fuel cell stack via a single outlet riser channel made from the corresponding openings 222, 508 in the respective anode-side and cathode-side shaped metal sheets 140, 144.

Fuel may exit the fuel cell via the bridge 234 of the anode support frame 102. As shown in FIG. 4B, the plurality of ridges 134 on the second surface 130 of the anode frame 102 may define a plurality of exit channels 236 between the ridges 134 in the bridge 234. The fuel may exit the fuel cell 120 via the exit channels 236 (as indicated by the arrows).

As is shown in the embodiment of FIGS. 2A-4B, the interconnect 100 provides internal manifolding for fuel through the interconnects 100, but not through the fuel cells 120 to which the interconnects 100 are attached. Thus, there is no need to provide riser openings in the fuel cell electrolyte, as is currently done. This may provide significant advantages in cost reduction, both in terms of reducing manufacturing costs, as well as improving the performance and reliability of fuel cell stacks. In existing systems, the riser openings in the fuel cell electrolyte frequently lead to cracks forming in the electrolyte, which can result in failure of the system. This problem may be avoided by the use of the present interconnect 100. Also, since there are no riser openings through the anode and cathode support frames, this may make manufacturing of the support frames easier than in conventional interconnect designs.

Figure 5B:
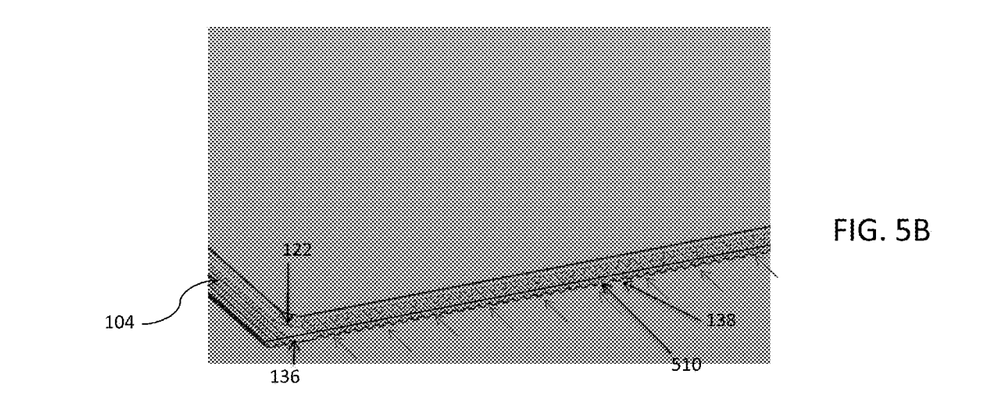
FIG. 5B illustrates the air flow through a cathode support frame of the interconnect of FIG. 5A according to one embodiment.

FIGS. 5A and 5B illustrate the cathode-side (e.g., air) flow path of the interconnect 100 according to one embodiment. FIG. 5A shows the cathode-facing major surface 114 of the gas flow separator section 106. In embodiments, the surface 114 may be the surface of a shaped metal sheet 144. As previously discussed, the cathode-facing major surface 114 includes a ridged portion 110. The ridged portion 110 may contact against the cathode-side of a fuel cell (not shown) to form an air flow field. As shown in FIG. 5A, the ridged portion 110 includes a plurality of ridges or ribs 502 defining channels 504 between adjacent ridges 502. In embodiments, the ridged portion 110 may be formed via a stamping process on a thin metal sheet. In one embodiment, the channels 504 formed between adjacent ridges 502 can have a depth that is less than about 10 mm, such as less than about 5 mm (e.g., 0.5 to 2.5 mm), and in preferred embodiments may have a depth of less than about 1 mm. The air may flow through the channels 504 in the ridged portion 110, where the air may contact the cathode electrode on the cathode-side of the fuel cell (not shown). In embodiments, the direction of air flow may be counter-current to the direction of fuel flow on the opposite side of the fuel cell over at least a portion of the respective flow fields. Alternatively, the air may flow co-current to the direction of fuel flow. The air and fuel flow fields may also have a cross-flow configuration over at least a portion of the respective flow fields. In embodiments, the fuel cell stack may be externally manifolded for air, and thus a separate manifold and riser structure for air may not be needed in the interconnect 100. In embodiments, as shown in FIG. 5A, air may enter from the longer side 308 and exit from the shorter side 306 of the gas flow separator 306.

As shown, for example, in FIG. 1, the cathode-facing surface 114 of metal sheet 144 is configured to interface with a cathode support frame 104 attached to the adjacent fuel cell 120 in a fuel cell stack. FIG. 5B illustrates an example of a cathode support frame 104. When the interconnect(s) 100 and fuel cell(s) 120 are incorporated into a stack, the second surface 136 of the cathode frame 104 is configured to contact the cathode-facing major surface 114 of a shaped metal sheet 144. As previously discussed, the cathode support frame 104 may include a plurality of ridges 138 on the second surface 136 of the frame. The ridges 138 define channels 510 via which air may enter and flow through the cathode support frame 104 (as indicated by the arrows). Upon exiting the channels 510, the air may then enter the channels 504 formed in the cathode-side shaped metal sheet 144 (see FIG. 5A) and flow across the cathode-side of a fuel cell. A similar set of channels 510 may be provided on the opposite side of the cathode support frame 104 to allow the air to exit the fuel cell.

Figure 6A:
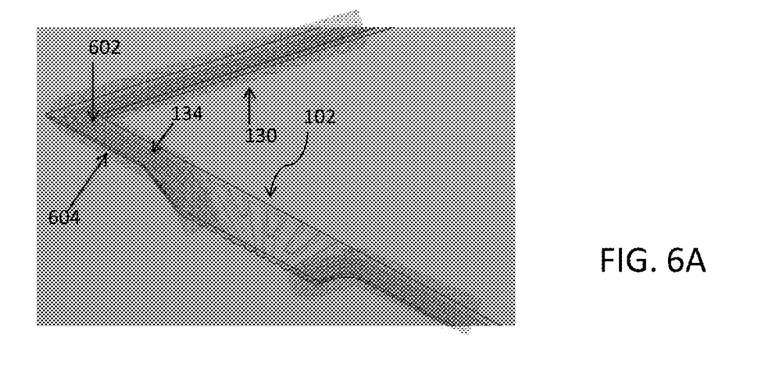
FIGS. 6A and 6B schematically illustrate the sealing of anode and cathode support frames to a gas flow separator section if the interconnect according to one embodiment.
Figure 6B:
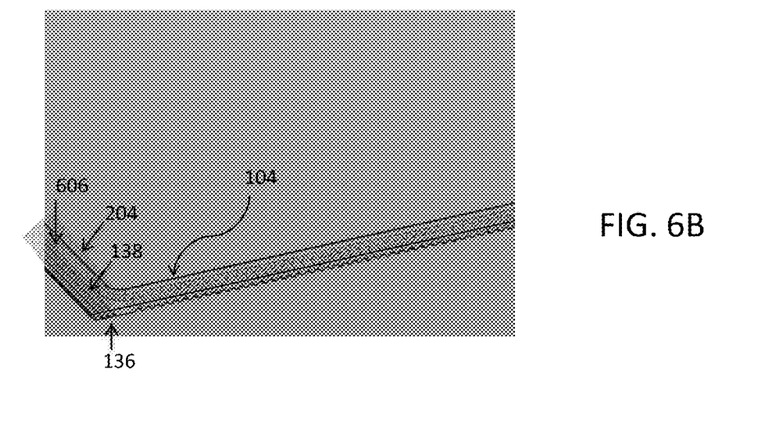

FIGS. 6A and 6B illustrate the sealing of the anode and cathode support frames 102, 104 to the gas flow separator section 106. As shown in FIG. 6A, the ridges 134 in the second surface 130 of the anode support frame 102 may define channels or grooves 602. A sealant material 604, such as a glass or glass-ceramic seal, may be provided on the second surface 130 of the anode support frame 102 and within the grooves 602. The sealant material 604 is preferably omitted in the portions of the frame 102 through which the fuel enters and exits. Similarly, as shown in FIG. 6B, the ridges 138 in the second surface 136 of the cathode support frame 104 may define channels or grooves 606, and a sealant material 604, such as a glass seal, may be provided on the second surface 136 and within the grooves 606. The sealant 604 may be omitted from the portions of the frame 105 through which air enters and exits. Stress from the CTE mismatch between the sheet metal surfaces of the gas flow separator section 106 and the anode and cathode support frames 102, 104 may be managed by the strength in the metal frame. Minimal stress may be experienced at the interfaces between the support frames 102, 104 and the fuel cell itself, due to the minimal CTE mismatch between these components. During thermal cycling, the CTE difference between the anode and cathode support frames 102, 104, which may be made of a Cr—Fe material, and the sheet metal surfaces of the gas flow separator section 106, which may be made of a different material (e.g., Inconel® or Haynes® alloys) may result in shear stress. In some embodiments, the sealant material 604 may be a glass seal that is configured to fracture in response these shear stresses. The fractured sealant may be contained within the grooves 602, 606, and the integrity of the seal may be maintained.

As shown in FIG. 1, for example, the regions of the anode support frame 102 and the cathode support frame 104 that interface with the fuel cell may be substantially symmetric with one another, and may be attached to opposite sides of a fuel cell 120 via window seals 126, 128. The load on the fuel cell is thus balanced between the anode-side and cathode-side of the cell. This is different from prior art designs, which provide asymmetric loading on the fuel cell.

Figure 7:
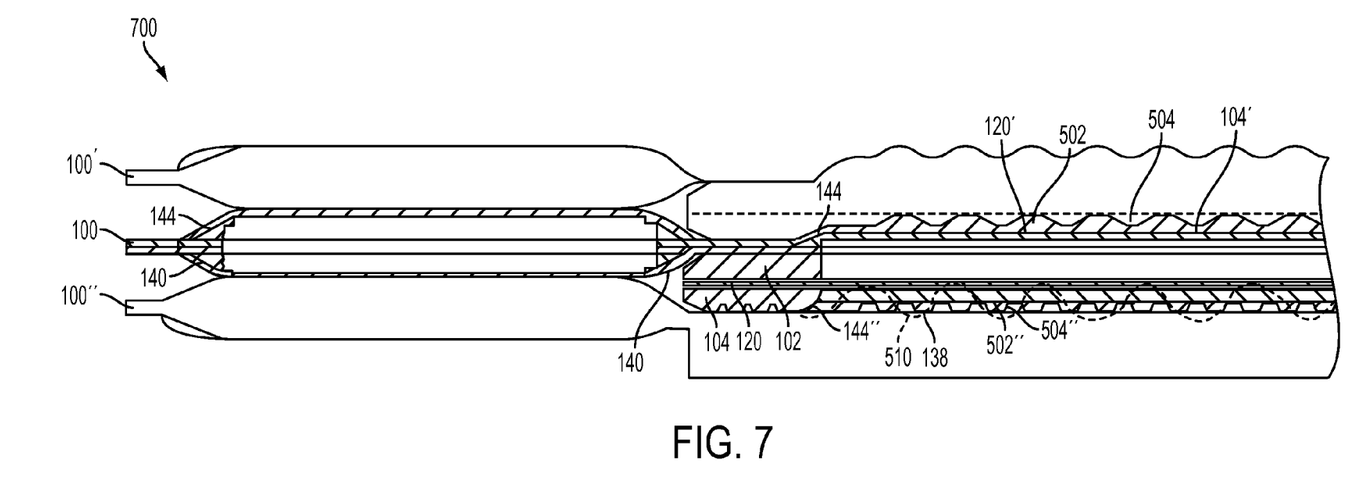
FIG. 7 is a side-view schematic illustration of a fuel cell stack according to an embodiment.

The interconnects 100 according to the various embodiments may be incorporated into a fuel cell stack. FIG. 7 schematically illustrates a side-view of an interconnect 100 provided in a fuel cell stack 700. A second interconnect 100' is shown adjacent to the interconnect 100 on a first side, and a third interconnect 100" is shown adjacent to the interconnect 100 on the opposite side. As is shown in FIG. 7, the interconnect 100 includes an anode support frame 102 and a cathode support frame 104 and a fuel cell 120 between the anode support frame 102 and the cathode support frame 104. An anode-side shaped metal sheet 140 is adjacent to the anode-support frame 102, and a cathode-side shaped metal sheet 144 is adjacent to the anode-side shaped metal sheet 140 (isothermal plate 142, which may be between the anode-side sheet 140 and the cathode-side sheet 144 is not shown in this view). The cathode support frame 104' of the adjacent interconnect 100' is shown in phantom to illustrate that the ridges 502 of the cathode-side shaped metal sheet 144 contact against the cathode-side of the adjacent fuel cell 120' (also shown in phantom). Air flow channels 504 are defined between adjacent ridges 502. Also, the bottom surface of the cathode support frame 104 includes ridges 138 defining channels 510 between the ridges 138. Interior to the cathode support frame 104 in this view, and also shown in phantom, is the cathode-side shaped metal sheet 144" of adjacent interconnect 100". The shaped metal sheet 144" of interconnect 100" includes ridges 502" that contact against the cathode-side of fuel cell 120. Air may flow through channels 510 in the cathode support frame 104 and then across the cathode-side of the fuel cell 120 via channels 504" defined between the ridges 502" of shaped metal sheet 144". The fuel cell stack 700 shown in FIG. 7 is a bipolar stack rather than a prismatic stack.

Figure 8:
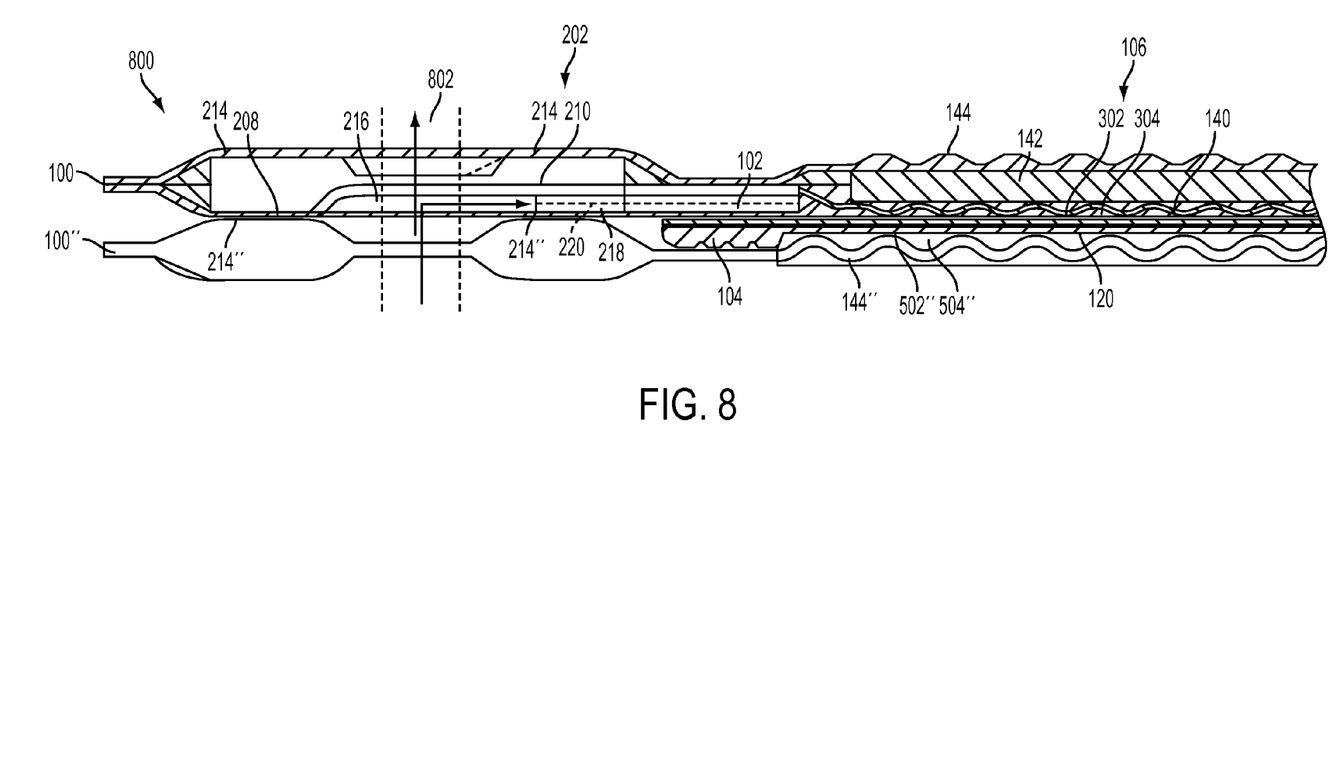
FIG. 8 is a cross-section schematic illustration of a portion of a fuel cell stack according to an embodiment.

FIG. 8 is a schematic cross-section view of a fuel cell stack 800, similar to stack 700. In FIG. 8, two interconnects 100, 100" are shown. FIG. 8 more clearly illustrates the ridges 502" and channels 504" that define the air flow field between the cathode-side of the fuel cell 120 and the cathode-side shaped metal sheet 144" of interconnect 100". FIG. 8 also more clearly illustrates the gas flow separator portion 106 of the interconnect 100, including anode-side shaped metal sheet 140, cathode side shaped metal sheet 144, and isothermal plate 142. FIG. 8 also illustrates the fuel inlet portion 202 of the interconnect 100. Openings in the interconnects 100, 100" (not shown) provide a fuel inlet channel (i.e., riser opening) 802, shown in phantom. The region within the raised portion 208 of anode-side shaped metal sheet 140 of the first interconnect 100 and the raised portion 214" of the cathode-side shaped metal sheet 144" of the adjacent interconnect 100" defines an inlet fuel plenum 216. The bridge 218 of the anode support frame 102 extends into the gap 210 in the raised portion 208 of the anode-side shaped metal sheet 140 and contacts the raised portion 214" of interconnect 100". The fuel may enter the fuel cell 120 via one or more channels 220 (shown in phantom) provided between the anode support frame 102 bridge 218 and the anode-side shaped metal sheet 140. The fuel flows across the anode-side of the fuel cell 120 through channels 304 formed between adjacent ridges 302 of the anode-side shaped metal sheet 140.

Figure 9:
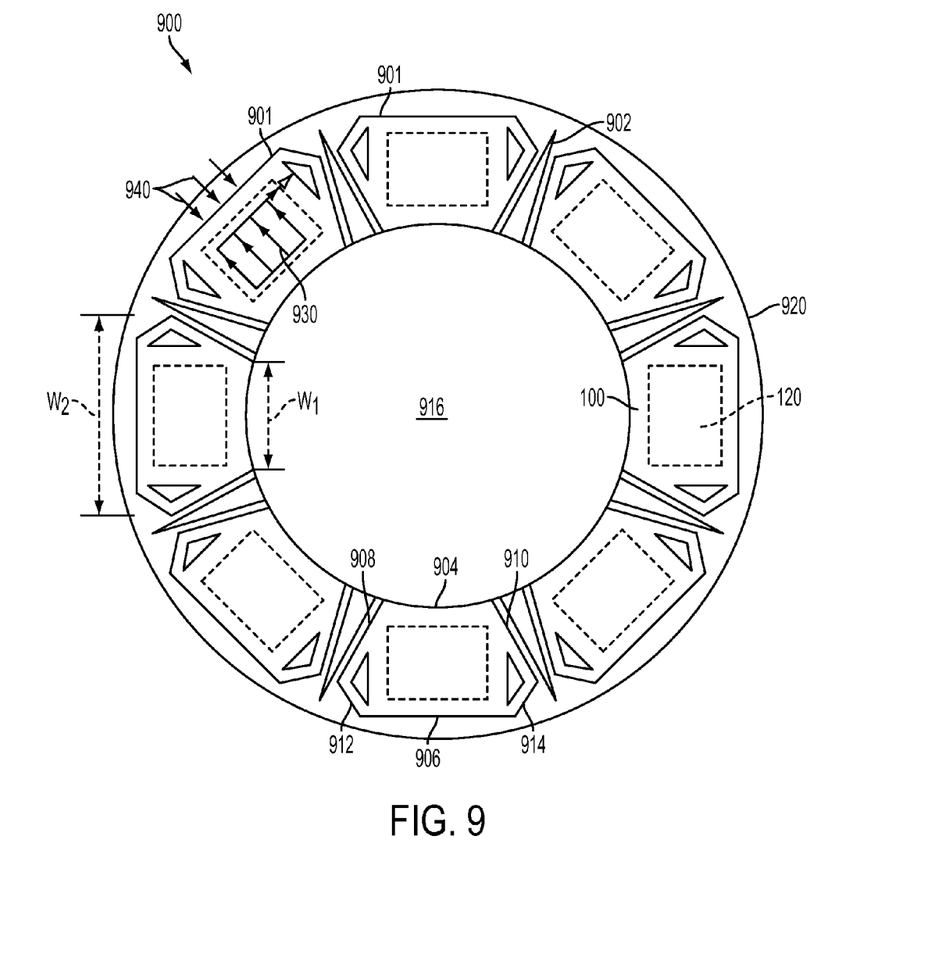
FIG. 9 a top cross-sectional view schematically illustrating a fuel cell system comprising a plurality of fuel cell stacks.

FIG. 9 schematically illustrates a top cross-sectional view of a fuel cell system 900 comprising a plurality of fuel cell stacks 901A hot box base 920 may support the stacks 901, and a lid may be placed over the stacks to form a hot box. Each stack 901 may include a plurality of fuel cells 120 and interconnects 100. The fuel cell system 900 may be generally cylindrically shaped, e.g., cylindrically-shaped base 920 and cylindrically-shaped lid (not shown). The cross-sectional shape of each stack 901 may be asymmetric perpendicular to an axis of the stack, and may correspond to the shape of the interconnects 100 in the stack. In embodiments, the interconnect 100 may have a generally asymmetric shape having a first edge 904, which may be positioned in the interior of the generally cylindrically-shaped system 900, and a second edge 906, which may be positioned proximate to an outer surface of the system 900. The interconnect 100 may have a width dimension that increases from a first width (W₁) at the first edge 904 to a second width (W₂) at a position that is closer to the second edge 906 than to the first edge 904. In embodiments, the second edge 906 may be longer than the first edge 904. In embodiments, the interconnect 100 may be a six-sided structure including the first edge 904, the second edge 906, a first pair of side edges 908, 910, and a second pair of side edges 912, 914. The width of the interconnect 100 may increase from the first edge 904 along the length of the first pair of side edges 908, 910, and may then decrease along the length of the second pair of side edges 912, 914 to the second edge 906. The direction of fuel flow through the stacks 901 according to one embodiment is shown by arrows 930 and the airflow direction through the stacks is shown by arrows 940. As shown in FIG. 9, the fuel and air flows may have a counterflow configuration over at least a portion of their flow path(s). In embodiments, the fuel and air flows may have a co-current flow configuration over at least a portion of their flow paths. The fuel cell stacks 901 may be separated by baffles 902, such as ceramic baffles, between adjacent stacks 901. A plenum 916, which may transport fuel to the various stacks 901, may be provided in the center of the fuel cell system 900. Various other components of a hot box fuel cell system, which may be utilized in the fuel cell system 900, are described in commonly-owned U.S. application Ser. No. 13/344,077, filed Jan. 5, 2012, the entire contents of which are incorporated herein by reference.

While solid oxide fuel cell interconnects and electrolytes are described above in various embodiments, embodiments can include any other fuel cell interconnects, such as molten carbonate, phosphoric acid or PEM fuel cell interconnects, or any other shaped metal or metal alloy or compacted metal powder or ceramic objects not associated with fuel cell systems.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step or component of any embodiment described herein can be used in any other embodiment.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. An interconnect for a fuel cell stack, comprising:
   a first support frame having a first surface that is configured to be secured to a first surface of a first fuel cell in the stack, the first support frame having a coefficient of thermal expansion (CTE) that matches within 1% of a CTE of an electrolyte material of the first fuel cell; and
   a gas flow separator section that is secured to a second surface of the first support frame, opposite the first surface of the first support frame, the gas flow separator section having a CTE that differs by greater than 10% from the CTE of the electrolyte material of the first fuel cell.

2. The interconnect of claim 1, wherein the first support frame comprises an open region, and the gas flow separator section comprises a ridged portion over a first major surface of the gas flow separator section, such that when the gas flow separator is attached to the second surface of the first support frame, the ridged portion is configured to contact the first surface of the fuel cell to define a first fluid flow field, wherein the gas flow separator section is impermeable to fuel and air.

3. The interconnect of claim 1, further comprising:
   a second support frame having a first surface that is configured to be secured to a second surface of a second fuel cell, opposite the first surface of the first fuel cell, the second support frame having a coefficient of thermal expansion (CTE) that matches within 1% of a CTE of the electrolyte material of the second fuel cell, wherein the second support frame comprises a second surface, opposite the first surface, that is configured to contact a surface of the gas flow separator section, and an open region, such that when the gas flow separator contacts the second surface of the second support frame, a ridged portion of the second major surface of the gas flow separator contacts against the second surface of the second fuel cell to define a second fluid flow field.

4. The interconnect of claim 3, wherein at least one of:
   (a) the first support frame and the second support frame are symmetric with respect to each other when attached to the gas flow separator section,
   (b) the first support frame and the second support frame are comprised of a metal material containing chromium, and the metal material comprising approximately 93-97% chromium and approximately 4-6% iron and the frames are made by powder metallurgy,
   (c) the interconnect comprises a first window seal for attaching the first support frame to a first side of the first fuel cell and a second window seal for attaching the second support frame to the second side of the second fuel cell, and
   (d) the first support frame and the second support frame have a coefficient of thermal expansion (CTE) between about $7\times10^{-6}/°$ C. and about $13\times10^{-6}/°$ C.

5. The interconnect of claim 2, wherein at least one of the first major surface of the gas flow separator section and a second major surface of the gas flow separator section comprises a surface of a shaped metal sheet that is stamped to form a ridged section.

6. The interconnect of claim 5, wherein the gas flow separator section further comprises a first shaped metal sheet defining the first major surface of the gas flow separator section and a second shaped metal sheet defining the second major surface of the gas flow separator section, wherein at least one of:
   (a) the gas flow separator further comprises an isothermal plate between the first shaped metal sheet and the second shaped metal sheet,
   (b) the gas flow separator further comprises an isothermal plate and the first shaped metal sheet, the second shaped metal sheet and the isothermal plate are made of the same metal material, and (c) the first shaped metal sheet is attached to the second shaped metal sheet via one or more of laser welding, friction welding, brazing and spot welding.

7. The interconnect of claim 1, wherein at least one of:

(a) the gas flow separator section has a CTE that differs from the CTE of the fuel cell electrolyte material by at least about 1.0%, (b) the interconnect further comprises a seal at an interface between the second surface of the first support frame and the gas flow separator section, wherein the seal comprises a glass or glass-ceramic seal, (c) the interconnect further comprises a seal at an interface between the second surface of the first support frame and the gas flow separator section, wherein the second surface of the first support frame comprises a plurality of ridges, and the seal is provided within the ridges, and (d) the first surface of the first fuel cell comprises an anode-side of the fuel cell.

8. The interconnect of claim 3, wherein the first surface of the first fuel cell comprises an anode-side of the first fuel cell and the second surface of the second fuel cell comprises a cathode-side of the second fuel cell, and the gas flow separator section comprises:

a fuel inlet portion for delivering a fuel to the first fluid flow field; and a fuel outlet portion for removing fuel from the first fluid flow field, and wherein at least one of:

(a) the interconnect delivers fuel to the first fluid flow field and removes fuel from the first fluid flow field without flowing fuel through an opening in the first fuel cell electrolyte, (b) the fuel inlet portion comprises an inlet opening extending through the gas flow separator section, a raised portion in the first major surface of the gas flow separator section, the raised portion completely surrounding the inlet opening with the exception of a gap in the raised portion, and a bridge portion of the first support frame that extends into the gap, the bridge portion including at least one channel defining a fluid flow path between the inlet opening and the first fluid flow field, and (c) the fuel outlet portion comprises an outlet opening extending through the gas flow separator section, a raised portion in the first major surface of the gas flow separator section, the raised portion completely surrounding the outlet opening with the exception of a gap in the raised portion, and a bridge portion of the first support frame that extends into the gap, the bridge portion including at least one channel defining a fluid flow path between the first fluid flow field and the outlet opening.

9. The interconnect of claim 8, wherein at least one of the fuel inlet portion and the fuel outlet portion comprises:

a raised portion completely surrounding an opening extending through the gas flow separator section with the exception of a gap in the raised portion;

a bridge portion of the first support frame that extends into the gap, the bridge portion including at least one channel defining a fluid flow path between the opening and the first fluid flow field, and a plenum seal extending over the raised portion and a surface of the bridge portion, wherein the plenum seal is configured to seal with a surface of an adjacent interconnect in a fuel cell stack to provide at least one of an inlet fuel plenum and an outlet fuel plenum.

10. The interconnect of claim 3, wherein the second surface of the second support frame comprises ridges defining fluid channels such that when the support frame contacts a gas flow separator section, air enters and exits the second fluid flow field via the fluid channels, the interconnect further comprising a seal at an interface between the second surface of the second support frame and a gas flow separator, wherein the seal is provided over a portion of the ridges on the second surface of the second support frame.

11. A fuel cell stack, comprising:

a plurality of fuel cells each having an anode-side and a cathode-side and an electrolyte material having a first coefficient of thermal expansion (CTE); and a plurality of interconnects according to claim 1, wherein each interconnect comprises:

the first support frame comprises an anode support frame attached directly or indirectly to the anode-side of a first one of a plurality of fuel cells;

a cathode support frame attached to the cathode-side of a second one of the plurality of fuel cells, the anode support frame and the cathode support frame being formed of a material having a CTE that matches within 1% of the CTE of the electrolyte material of the first and second fuel cells; and the gas flow separator section provided between the anode support frame and the cathode support frame, the gas flow separator section being formed of a material having a CTE that differs by greater than 10% from the CTE of the electrolyte material of the fuel cells.

12. The fuel cell stack of claim 11, wherein at least one of:

(a) during operation of the stack, thermal stress forces are generated primarily at interfaces between the gas flow separator section and the anode and cathode support frames, and no thermal stress forces are generated at an interface between the anode and cathode support frames and the first and the second fuel cells, (b) the fuel cells comprise solid oxide fuel cells, (c) the gas flow separator section comprises an anode-facing major surface that contacts the anode-side of the first fuel cell in the stack to define an anode flow field and a cathode-facing major surface that contacts the cathode-side of the second fuel cell in the stack to define a cathode flow field, (d) the first and second major surfaces of the gas flow separator section comprises shaped metal sheets, (e) the electrolyte material, the first support frame and the second support frame have a coefficient of thermal expansion (CTE) within about 1.0% of each other, and the gas flow separator section has a CTE that differs from the electrolyte material by more than 1.0%, and (f) the gas flow separator section comprises an isothermal plate provided between first and second shaped metal sheets.

\* \* \* \* \*